(12) United States Patent
Xie et al.

(10) Patent No.: US 8,043,460 B2
(45) Date of Patent: Oct. 25, 2011

(54) REVERSIBLE DRY ADHESIVES

(75) Inventors: Tao Xie, Troy, MI (US); Xingcheng Xiao, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 620 days.

(21) Appl. No.: 11/867,531

(22) Filed: Oct. 4, 2007

(65) Prior Publication Data

US 2008/0257485 A1  Oct. 23, 2008

Related U.S. Application Data

(60) Provisional application No. 60/925,418, filed on Apr. 20, 2007.

(51) Int. Cl.
  *B32B 38/10* (2006.01)
  *C08G 59/14* (2006.01)
  *C08G 59/16* (2006.01)

(52) U.S. Cl. ........ 156/247; 156/311; 156/499; 156/230; 428/413; 428/421; 428/457; 428/426; 525/524; 525/407; 528/121

(58) Field of Classification Search .................. 156/311, 156/247, 499, 230; 428/413, 423.1, 421, 428/457, 426; 525/524, 407; 528/121
See application file for complete search history.

(56) References Cited

U.S. PATENT DOCUMENTS

| | | | |
|---|---|---|---|
| 4,552,933 A | 11/1985 | Sellstrom et al. | |
| 4,882,399 A | 11/1989 | Tesoro et al. | |
| 5,755,913 A | 5/1998 | Liaw et al. | |
| 6,156,842 A * | 12/2000 | Hoenig et al. | 525/171 |
| 6,589,892 B1 * | 7/2003 | Smith et al. | 442/414 |
| 6,759,481 B2 | 7/2004 | Tong | |
| 6,773,535 B1 | 8/2004 | Wetzel | |
| 6,827,325 B2 | 12/2004 | Hofmann et al. | |
| 6,986,855 B1 | 1/2006 | Hood et al. | |
| 7,188,498 B2 | 3/2007 | Browne et al. | |
| 2001/0047579 A1 | 12/2001 | Lee et al. | |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |
| 2005/0274455 A1 | 12/2005 | Extrand | |
| 2006/0036045 A1 | 2/2006 | Wilson et al. | |
| 2006/0156535 A1 | 7/2006 | Browne et al. | |
| 2006/0188706 A1 * | 8/2006 | Kobayashi et al. | 428/317.1 |
| 2007/0073130 A1 | 3/2007 | Finch et al. | |
| 2007/0289786 A1 | 12/2007 | Cutkosky et al. | |

(Continued)

FOREIGN PATENT DOCUMENTS

DE  10357355 A1  7/2005

(Continued)

OTHER PUBLICATIONS

Aubert et al., Thermally Removable Epoxy Adhesives Incorporating Themrally Reversible Diels-Alder Adducts, The Journal of Adhesion, 2003, vol. 79, pp. 609-616.*

(Continued)

*Primary Examiner* — Khanh P Nguyen
*Assistant Examiner* — Keith Aziz
(74) *Attorney, Agent, or Firm* — Reising Ethington P.C.

(57) ABSTRACT

One embodiment of the invention includes product comprising an elastomeric epoxy dry adhesive with a pull-off strength of 1-200 N/cm$^2$ from a substrate and reversibly detached with a peel-off force less than 1 N/cm.

17 Claims, 3 Drawing Sheets

U.S. PATENT DOCUMENTS

Figure 1:
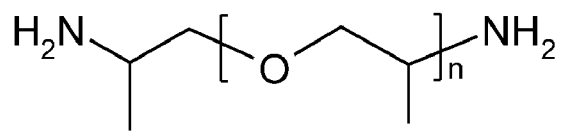
Figure 1:

2008/0269420 A1* 10/2008 Tong et al. .................. 525/208

FOREIGN PATENT DOCUMENTS

JP        2003073453 A    3/2003

OTHER PUBLICATIONS

Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.
Xie et al., Self-Peeling Reversible Dry Adhesive System, Chem. Mater., 2008, pp. 2866-2868, vol. 20.
Liu et al., Chemically Cross-Linked Polycyclooctene: Synthesis, Characterization and Shape Memory Behavior, Macromolecules, 2002. pp. 9868-9874, vol. 35.
Lendlein et al., Biodegradable, Elastic Shape-Memory Polymers for Potential Biomedical Applications, Science, May 31, 2002, pp. 1673-1676, vol. 296.
Lee et al., Structure and Thermomechanical Properties of Polyurethane Block Copolymers with Shape Memory Effect, Macromolecules, 2001, pp. 6431-6437, vol. 34.
Lin et al., Study on Shape-Memory Behavior of Polyether-Based Polyurethanes. I. Influence of the Hard-Segment Content, J. of Applied Polymer Science, 1998, pp. 1563-1574, V.69.
Lin et al., Study on Shape-Memory Behavior of Polyether-Based Polyurethanes. II. Influence of Soft-Segment Molecular Weight, J. of App. Polymer Science, 1998, pp. 1575-1586, 69.
EPON Resin 828 Structural Reference Manual, Shell Chemicals, Houston, TX.
Gall et al., Shape Memory Polymer Nanocomposites, Acta Materialia, 2002, pp. 5115-5126, vol. 50.
Gall et al., Internal Stress Storage in Shape Memory Polymer Nanocomposites, Applied Physics Letter, Jul. 12, 2004, pp. 290-292, vol. 85, No. 2.
Xu et al., Synthesis and Shape Memory Effects of Si—O—Si Cross-Linked Hybrid Polyurethanes, Polymer, 2006, pp. 457-465, vol. 47.
Crystallisation of Liquid DGEBPA and DGEBPF Epoxy Resins, Resolution Performance Products, Product Bulletin, SC:2365-01, Jul. 2001.
Jeffamine D-230 Polyetheramine, Technical Bulletin, Huntsman Corporation, Copyright 2006.
Xie et al., Self-Peeling Reversible Dry Adhesive System, Materials, & Processes Laboratory, General Motors Research & Development Center, Chem. Mater. 2008,vol. 20, pp. 2866-2862.
Aubert et al., Thermally Removable Epoxy Adhesives Incorporating Thermally Reversible Diels-Alder Adducts, The Journal of Adhesion, 2003, vol. 79, pp. 609-616.
International Search Report and Written Opinion, International Application No. PCT/US/2008/060796 Filed Apr. 18, 2008, Appicant GM Global Technology Operations, Inc.
Unver et al., Geckbot: A Gecko Inspired Climbing Robot Using Elastomer Adhesives.
Daltorio et al., A Small Wall-Walking Robot with Compliant, Adhesive, Feet, IEEE/RSJ International Conference on Intelligent Robots and Systems, 2005, pp. 4018-4023.
International Search Report and Written Opinon, International Application No. PCT/US2008/060826 filed Apr. 18, 2008, Applicant GM Global Technology Operations, Inc.
Lee et al., A Reversible Wet/Dry Adhesive Inspired by Mussels and Geckos, Nature, Jul. 19, 2007, pp. 338-342, vol. 448.
Lee et al., Single-Molecule Mechanics of Mussel Adhesion, PNAS, Aug. 29, 2005, pp. 12999-13-12999-3, vol. 103, No. 35.
Veriflex Shape Memory Polymer, http://www.crgrp.net/veriflex.shtml, Cornerstone Research Group, Inc., 2003-2007.
Shape Memory Polymer, http://crgnp.net/success-stories.shtml, Cornerstone Research Group, Inc., 2003-2007.
Tembo Shape Memory Polymers and Elastic Memory Composite (EMC) Material, http://www.ctd-materials.com/products/emc.htm, Cornerstone Research Group, Inc., 2003-2007.
Behl et al., Shape-Memory Polymers: Dual Shape Materials for Bio-medical Applications, A. Mater. Today, 2007, vol. 10, pp. 1-20.
Bellin et al., Polymeric Triple-Shape Materials, PNAS, Nov. 28, 2006, vol. 103, No. 48, pp. 18043-18047.
Chung et al., Two-Way Reversible Shape Memory in a Semicrystalline Network, Macromolecules, 2008, vol. 41, pp. 184-192.
Rousseau et al., Shape Memory Effect Exhibited by Smectic-C Liquid Crystalline Elastomers, J. Am. Chem. Soc., 2003, vol. 125, pp. 15300-15301.
Liu et al., Review of Progress in Shape-Memory Polymers, Journal of Materials Chemistry, 2007, vol. 17, pp. 1543-1558.
Dietsch et al., A Review—Features and Benefits of Shape Memory Polymers (SMPs), Journal of Advanced Materials, Apr. 2007, vol. 39, No. 2, pp. 3-12.
Li et al., Shape Memory Effect of Ethylene-Vinyl Acetate Copolymers, Journal of Applied Polymer Science, 1999, vol. 71, pp. 1063-1070.
Liu et al., Novel Shape-Memory Polymer with Two Transition Temperatures, Macromol. Rapid Commun., 2005, vol. 26, pp. 649-652.
Reyntjens et al., Polymer Networks Containign Crystallizable Poly(octadecyl vinyl ether) Segments for Shape-Memory Materials, Macromol. Rapid Commun., 1999, vol. 20,pp. 251-255.
Jiang et al., Polymers Move in Response to Light, Advanced Materials., 2006, vol. 18, pp. 1471-1475.
Huang et al., Water-Driven Programmable Polyurethane Shape Memory Polymer: Demonstration and Mechanism, Applied Physical Letters, 2005, vol. 86, pp. 114105-1-114105-3.
Lendlein et al., Light-Induced Shape-Memory Polymers, Nature, Apr. 14, 2005, vol. 434, pp. 879-882.
Goethals et al., Poly(vinyl ethers) as Building Blocks for New Materials, Macromol. Symp. 1998, vol. 132, pp. 57-64.
Xiao, U.S. Appl. No. 12/273,083, Self-Healing and Scratch Resistant Shape Memory Polymer System, filed Nov. 18, 2008.
Xie, U.S. Appl. No. 11/867,531, Reversible Dry Adhesives, filed Oct. 4, 2007.
Xie, U.S. Appl. No. 12/396,045, Polymer Systems with Multiple Shape Memory Effect, filed Mar. 2, 2009.
Xie, U.S. Appl. No. 12/367,826, A Reversible Welding Process for Polymers, filed Feb. 9, 2009.
Xie, U.S. Appl. No. 12/178,844, High Strength Reversible Noncovalent Adhesion Methods for a Solid Polymer-Polymer Interface, filed Jul. 24, 2008.
Cheng, U.S. Appl. No. 12/359,709, Remote Activation of Thermo-Reversible Dry Adhesives, filed Jan. 26, 2009.
Xie, U.S. Appl. No. 12/423,947, Shape Memory Polymer and Adhesive Combination and Methods of Making and Using the Same, filed Apr. 15, 2009.
Xie, U.S. Appl. No. 12/432,211, Shape Memor Polymers with Surface Having Dangling Adhesive Polymeric Chains and Methods of Making and Using the Same, filed Apr. 29, 2009.
Xie, U.S. Appl. No. 12/181,562, Polymer Systems with Multiple Shape Memory Effect, filed Jul. 29, 2008.
Xie, U.S. Appl. No. 11/867,549, Method of Miniimizing Residue Adhesion for Thermo-Reversible Dry Adhesives, filed Oct. 4, 2007.
Xie, U.S. Appl. No. 12/105,865, Attachment Pad with Thermal Reversible Adhesive and Methods of Making and Using the Same, filed Apr. 18, 2008.
Xie, U.S. Appl. No. 11/867,558, Multilayer Adhesive for Thermal Reversible Joining of Substrates, filed Oct. 4, 2007.
Xie, U.S. Appl. No. 12/391,704, Reversible Dry Adhesives for Wet adn Dry Conditions, filed Feb. 24, 2009.
Xie, U.S. Appl. No. 12/105,749, Method for Robotic Handling Using Thermo-Reversible Dry Adhesives, filed Apr. 18, 2008.
Xie, U.S. Appl. No. 12/105,788, Climbing Devices Based on Thermo-Reversible Dry Adhesives, filed Apr. 18, 2008.
Xie, U.S. Appl. No. 11/867,588, Shape Memory Epoxy Polymers, filed Oct. 4, 2007.

* cited by examiner

Jeffamine D-230 (n=2.69)

NGDE

EPON 826 (n=0.085)

octadecyl amine

REVERSIBLE DRY ADHESIVES

This application claims the benefit of U.S. Provisional Application No. 60/925,418, filed Apr. 20, 2007.

FIELD OF THE INVENTION

The field to which the disclosure generally relates includes compositions of epoxy dry adhesives.

BACKGROUND

Gecko feet pads, with nanohair structures on them, are examples of smart dry adhesives. The working principle of the Gecko adhesion is that the nanohair structure allows the foot pad to make maximum contact with a counter surface regardless of its roughness and chemical composition. This is accomplished by nanohairs that are relatively long and protruding from the foot pad at an angle so that adjacent nanohairs can contact the counter surface regardless of its topography. The maximum contact further allows for accumulation of millions of small van der Waals (in the range of microNewtons) interactions between the Gecko foot pad and the counter surface, leading to an overall adhesion force (pull-off force) of about 10 $N/cm^2$. When the detaching force is employed in a peel-off mode, however, the complete detachment is achieved gradually by overcoming small adhesion forces corresponding to very small areas. Thus, the adhesion is easily reversed. Overall, the attractiveness of the Gecko adhesion lies in the combination of adhesive strength (10 $N/cm^2$), reversibility, and the ability to adapt to a variety of surfaces in terms of both the surface roughness and composition. The above unique features of the Gecko adhesion has stimulated scientific research efforts to produce synthetic smart dry adhesives that work using the same principle as the Gecko feet. Up to now, the two best synthetic Gecko adhesives show maximum pull-off adhesive strength of 3 and 10 $N/cm^2$ towards glass. Both adhesives suffer from severe adhesion loss after only one or two attaching/detaching cycles, as a result of breakdown and the lateral collapse of the nano structures, with the latter referring to the adjacent nano hairs of the Gecko foot pad bonding to each other. In addition, synthetic Gecko adhesives are expensive to produce and large-scale manufacturing is practically too difficult.

SUMMARY OF EXEMPLARY EMBODIMENTS OF THE INVENTION

One embodiment of the invention includes a dry adhesive that functions similar to a gecko footpad.

One embodiment of the invention includes a product comprising an elastomeric epoxy dry adhesive with a pull-off strength of 1-200 $N/cm^2$ from a stainless steel 304 alloy substrate (SS304).

One embodiment of the invention includes a composition comprising an aliphatic diepoxy and a diamine curing agent.

Another embodiment of the invention includes a method comprising curing a composition comprising an aliphatic diepoxy and a diamine curing agent to provide an elastomeric epoxy dry adhesive capable of adhering to a surface with a pull-off strength greater than 10 $N/cm^2$ from an SS304 substrate and a peel-off force of 1 N/cm or less from the same substrate.

Another embodiment of the invention includes a method comprising providing an elastomeric epoxy dry adhesive produced from a composition including an aliphatic diepoxy and a diamine curing agent, placing the adhesive on a surface, preloading the adhesive with the force so that the adhesive has a pull-off strength greater than 10 $N/cm^2$ from an SS304 substrate, and peeling off the adhesive using a peel-off force of 1 $N/cm^2$ or less from the same substrate, and repeating the attaching and peeling off steps more than six times.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 1 illustrates the chemical structures of Jeffamine D-230 and NGDE.

FIG. 2 illustrates a pull-off force on a rigid backing of a dry epoxy adhesive.

FIG. 3 is a graph of pull-off strength versus attaching/detaching cycle number.

FIG. 4 illustrates the peel-off force of a dry adhesive.

FIG. 5 illustrates the chemical structures of EPON 826 and octadecyl amine.

DETAILED DESCRIPTION OF EXEMPLARY EMBODIMENTS

The following description of the embodiment(s) is merely exemplary in nature and is in no way intended to limit the invention, its application, or uses.

One embodiment of the invention includes a dry adhesive with functions similar to a gecko footpad. In one embodiment, the dry adhesive may have a glass transition temperature $T_g$ ranging from −90 to 25° C.

One embodiment of the invention includes a product comprising an elastomeric epoxy dry adhesive with a pull-off strength of 1-200 $N/cm^2$ from a SS304 substrate. With respect to the pull-off strength, the invention is not limited to a pull-off strength from a SS304 substrate. Various substrates may be used to achieve a pull-off strength of 1-200 $N/cm^2$.

One embodiment of the invention includes a composition comprising an aliphatic diepoxy and a diamine curing agent.

Another embodiment of the invention includes a method comprising curing a composition comprising an aliphatic diepoxy and a diamine curing agent to provide an elastomeric epoxy dry adhesive capable of adhering to a surface with pull-off strength greater than 10 $N/cm^2$ from an SS304 substrate and a peel-off force of 1 N/cm or less from the same substrate.

Another embodiment of the invention includes a method comprising providing an elastomeric epoxy dry adhesive produced from a composition including an aliphatic diepoxy and a diamine curing agent, placing the adhesive on a surface, preloading the adhesive with the force so that the adhesive has a pull-off strength greater than 10 $N/cm^2$ from an SS304 substrate, and peeling off the adhesive using a peel-off force of 1 N/cm or less from the same substrate, and repeating the attaching and peeling off steps more than six times.

In one embodiment of the invention, an elastomeric epoxy dry adhesive is produced. In one embodiment, 4.32 g of neopentyl glycol diglycidyl ether (NGDE) was mixed with 2.3 g of Jeffamine D-230, which is the curing agent poly (propylene glycol)bis(2-aminopropyl)ether. Jeffamine D-230 is a polyetheramine that is difunctional, primary amine with an average molecular weight of about 230. The primary amine groups are located on secondary carbons at the end of the aliphatic polyether chain. NGDE may be obtained from TCI America, and Jeffamine D-230 may be obtained from Huntsman. The chemical structures for Jeffamine D-230 and NGDE are shown in FIG. 1. A liquid mixture of the 4.32 g of NGDE and the 2.3 g of Jeffamine D-230 was poured into an aluminum mold. The mixture was cured in an oven for about 1.5 hours at 100° C. The mixture was then postcured for about 1 hour at 130° C.

Figure 2:
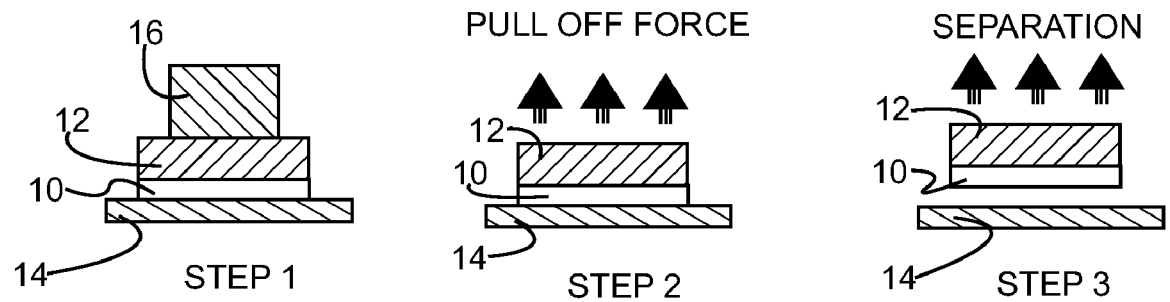

The cured epoxy dry adhesive was demolded and cut into pieces of about 1 cm×1 cm. To measure the pull-off force, one side of the 1 cm×1 cm epoxy dry adhesive piece 10 was bonded to a rigid substrate or backing 12 such as a rigid epoxy. The other side of the epoxy dry adhesive piece was placed on a substrate 14, for example SS304. A preload force of 4 N was imposed by applying a load 16 on the rigid substrate surface facing up with the dry epoxy adhesive side facing down to the substrate 14 as shown in FIG. 2.

Figure 3:
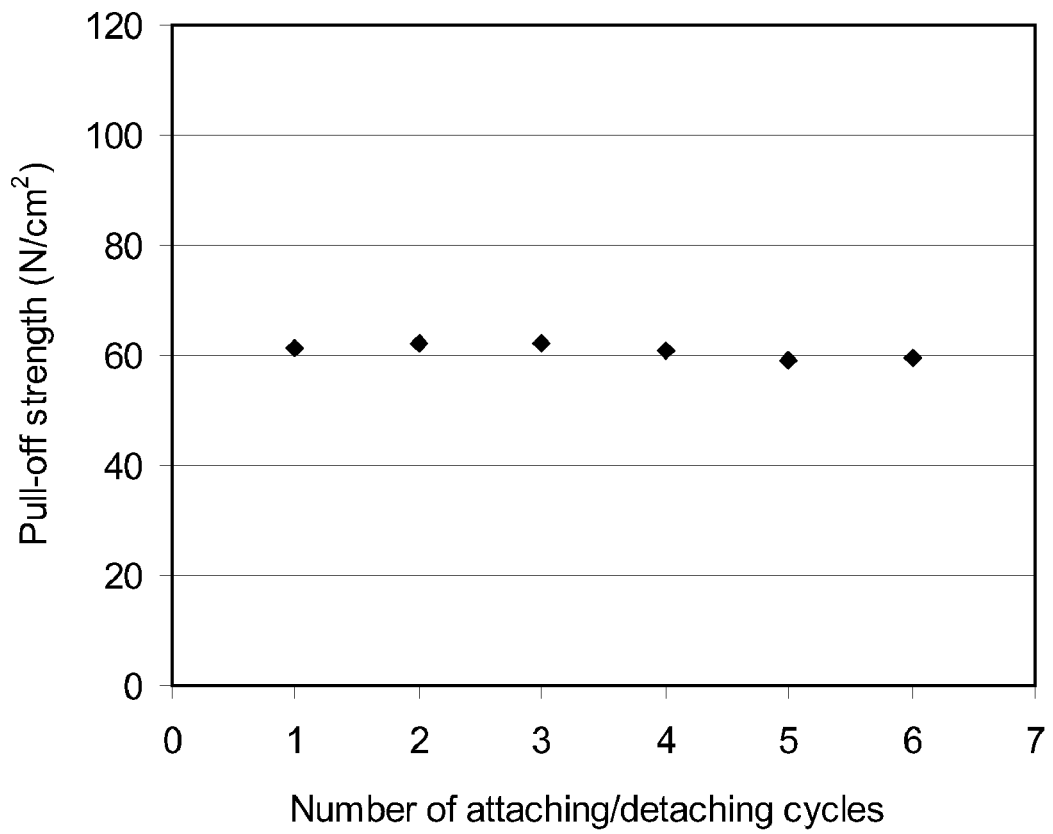

The adhesive forces were measured with a load cell and the maximum pull-off force corresponding to multiple attaching/detaching cycles for the same sample is shown in FIG. 3. The data in FIG. 3 shows that the pull-off force does not degrade after six attaching/detaching cycles and the average pull-off force was about 60 $N/cm^2$.

Figure 4:
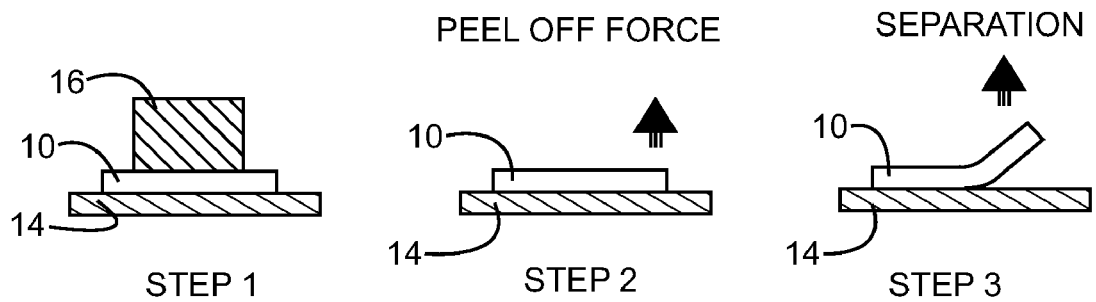

To measure the peel-off forces, the dry adhesive 10 with no rigid backing was pressed onto the SS304 surface 14 with a preload of 4 N applied by means of the load 16 and the separation force was imposed in a peel-off mode and measured with a load cell as illustrated in FIG. 4. The peel-off force was less than 1 N/cm. In one embodiment, the elastomeric dry adhesive can undergo multiple attaching and detaching cycles without adhesion loss.

In another embodiment, NGDE and Jeffamine D-230 were mixed in the ratios listed in Table 1 below. The mixtures were cured at 100° C. for 1.5 hours and postcured at 130° C. for 1 hour. The resulting pull-off strength at various molar ratios of NGDE to Jeffamine D-230 is shown in Table 1 below.

TABLE 1

Pull-off strength of samples 1-7

| Sample # | Molar ratio of NGDE/Jeffamine D-230 | Pull-off strength ($N/cm^2$) |
| --- | --- | --- |
| 1 | 2.12 | 52.4 |
| 2 | 2.09 | 49.6 |
| 3 | 2.04 | 56.1 |
| 4 | 2.00 | 50.7 |
| 5 | 1.96 | 60.0 |
| 6 | 1.92 | 59.0 |
| 7 | 1.89 | 43.8 |

Figure 5:
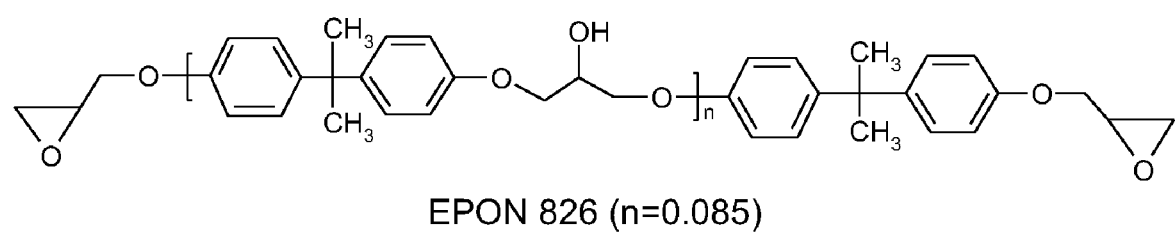
Figure 5:
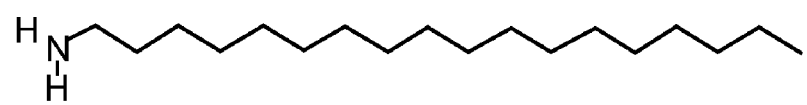

In another embodiment, while maintaining the total number of amine groups at twice the total number of epoxy groups, EPON 826 (the diglycidyl ether of bisphenol A epoxy monomer), Jeffamine D-230, and octadecyl amine ($CH_3(CH_2)_{17}NH_2$, an exemplary aliphatic monoamine) were mixed at different ratios. The chemical structures for EPON 826 and octadecyl amine are shown in FIG. 5. EPON 826 may be obtained from Hexion. The mixtures were cured at 100° C. for 1.5 hours and postcured at 130° C. for 1 hour. When the molar ratio between Jeffamine D-230 and octadecyl amine varied from 0 to infinity, the pull-off strength obtained from the cured epoxies fell within the range of 1 $N/cm^2$ to 100 $N/cm^2$ from an SS304 substrate.

The amine utilized in the composition according to various embodiments of the invention may be an aliphatic, branched, or aromatic amine.

One embodiment includes a method including curing a composition comprising at least one multi-functional epoxy (either aliphatic or aromatic) and at least one of a curing agent (for example, an aromatic or aliphatic anhydride, or an aromatic or aliphatic multi-amine) or a catalyst, to provide an elastomeric epoxy dry adhesive with a pull-off strength of 1-100 $N/cm^2$ from an SS304 substrate.

In various embodiments, the components of an elastomeric epoxy dry adhesive may include a rigid epoxy and a flexible extender. The range of possible crosslinking chemistries which may be used to achieve elastomeric epoxy dry adhesives may include alpha, omega-diaminoalkanes, organic multi-carboxylic acid, anhydride, or catalytic (as in imidazole type) crosslinking reactions. There are many different ways to achieve the appropriate relationships between the molecular properties. For example, the elastomeric epoxy dry adhesive may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various embodiments, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. The components of the dry adhesive may be present in an amount sufficient to provide, upon curing of the composition, an elastomeric epoxy dry adhesive having a glass transition temperature below room temperature and having a pull-off strength of 1-200 $N/cm^2$ from a substrate.

The above description of embodiments of the invention is merely exemplary in nature and, thus, variations thereof are not to be regarded as a departure from the spirit and scope of the invention.

What is claimed is:

1. An elastomeric epoxy dry adhesive composition comprising:

at least one of a rigid epoxy or a flexible epoxy; and at least one of a crosslinking agent or a catalytic curing agent;

at least one of an epoxy extender having, one epoxide group, or a diluent comprising a monoamine or a monocarboxylic acid;

wherein the rigid epoxy is an aromatic epoxy having at least two epoxide groups, the flexible epoxy is an aliphatic epoxy having at least two epoxide groups, and the crosslinking agent comprising at least one of a multi-amine, an organic multi-carboxylic acid, or an anhydride; and wherein the components are present in an amount sufficient to provide, upon curing of the composition, an elastomeric epoxy dry adhesive having a glass transition temperature below room temperature and having a pull-off strength of 1-200 $N/cm^2$ from a substrate; and when the crosslinking comprises a multi-amine the total number of epoxy groups to amine groups ranges from 1.89-2.12.

2. An elastomeric epoxy dry adhesive composition as set forth in claim 1 comprising an epoxy extender having one epoxide group.

3. An elastomeric epoxy dry adhesive composition as set forth in claim 1 comprising a diluent, wherein the diluent is a monoamine or a mono-carboxylic acid.

4. An elastomeric epoxy dry adhesive composition as set forth in claim 1 wherein the elastomeric epoxy dry adhesive has a pull-off strength of 10-100 N/cm$^2$ from a substrate.

5. An elastomeric epoxy dry adhesive composition as set forth in claim 1 wherein the elastomeric epoxy dry adhesive is capable of adhering to a substrate with a peel-off force less than 1 N/cm from the substrate.

6. An elastomeric epoxy dry adhesive composition as set forth in claim 1 comprising an aliphatic diepoxy and a diamine.

7. An elastomeric epoxy dry adhesive composition as set forth in claim 6 further comprising an aromatic diepoxy.

8. An elastomeric epoxy dry adhesive composition as set forth in claim 1 wherein the aromatic epoxy is the diglycidyl ether of bisphenol A epoxy monomer with an epoxy equivalent weight of 180.

9. An elastomeric epoxy dry adhesive composition as set forth in claim 1 wherein the aliphatic epoxy is NGDE.

10. An elastomeric epoxy dry adhesive composition as set forth in claim 1 wherein the multi-amine is poly(propylene glycol)bis(2-aminopropyl)ether with an average molecular weight of 230.

11. An elastomeric epoxy dry adhesive composition as set forth in claim 3 comprising an aromatic diepoxy, a diamine, and an aliphatic monoamine.

12. An elastomeric epoxy dry adhesive composition as set forth in claim 1 wherein the flexible epoxy has a molecular weight equal to or greater than 216.

13. An elastomeric epoxy dry adhesive comprising:
the reaction product of at least one of a rigid epoxy or a flexible epoxy, and at least one of a crosslinking agent or a catalytic curing agent;
said dry adhesive being cured at about 100° C. and post-cured at about 130° C.;
wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride; and
wherein the elastomeric epoxy dry adhesive has a glass transition temperature below room temperature and has a pull-off strength of 1-200 N/cm$^2$ from a substrate; and when the crosslinking comprises a multi-amine the total number of amine groups to epoxy groups ranges from 1.89-2.12.

14. An elastomeric epoxy dry adhesive as set forth in claim 13 further comprising the reaction product of an epoxy extender having one epoxide group.

15. An elastomeric epoxy dry adhesive as set forth in claim 13 further comprising the reaction product of a diluent, wherein the diluent is a monoamine or a mono-carboxylic acid.

16. An elastomeric epoxy dry adhesive composition comprising:
at least one of a rigid epoxy or a flexible epoxy; and
at least one of a crosslinking agent or a catalytic curing agent;
wherein the rigid epoxy is an aromatic epoxy having at least two epoxide groups, the flexible epoxy is an aliphatic epoxy having at least two epoxide groups, and the crosslinking agent comprising a multi-amine, and wherein the total number of epoxy groups to amine groups ranges from 1.89-2.12, and
wherein the components are present in an amount sufficient to provide, upon curing of the composition at least 100° C., an elastomeric epoxy dry adhesive having a glass transition temperature below room temperature and having a pull-off strength of 1-200 N/cm$^2$ from a substrate.

17. An elastomeric epoxy dry adhesive comprising:
the reaction product of at least one of a rigid epoxy or a flexible epoxy, and at least one of a crosslinking agent and a catalytic curing agent;
wherein the rigid epoxy is an aromatic epoxy having at least two epoxide groups, the flexible epoxy is an aliphatic epoxy having at least two epoxide groups, the catalytical curing agent comprises a tertiary amine, amine salt, boron trifluoride complex, or amine borate, and the crosslinking agent comprises a multi-amine, and wherein the total number of epoxy groups is about twice the total number of amine groups; and
wherein the elastomeric epoxy dry adhesive has a glass transition temperature below room temperature and has a pull-off strength of 1-200 N/cm$^2$ from a substrate.

* * * * *